United States Patent [19]

Iguchi

[11] Patent Number: 5,088,598
[45] Date of Patent: Feb. 18, 1992

[54] PLASTIC-MODEL KIT

[75] Inventor: Yuji Iguchi, Kanagawa, Japan

[73] Assignee: Daicel Chemical Industries, Ltd., Osaka, Japan

[21] Appl. No.: 514,470

[22] Filed: Apr. 25, 1990

[30] Foreign Application Priority Data

Apr. 25, 1989 [JP] Japan .................................. 1-105084
May 1, 1989 [JP] Japan .................................. 1-112440

[51] Int. Cl.⁵ ........................ B65D 71/00; B29C 39/12
[52] U.S. Cl. .................................... 206/223; 206/568;
206/575; 249/55; 249/134; 425/DIG. 57;
434/81; 434/82
[58] Field of Search .................. 425/DIG. 57; 249/55,
249/112, 114.1, 134; 206/223, 229, 568, 575,
582; 434/81, 82, 84, 96

[56] References Cited

U.S. PATENT DOCUMENTS

| 2,011,714 | 8/1935 | Friedman | 434/81 |
| 2,592,078 | 4/1952 | Taylor et al. | 434/81 |
| 2,755,587 | 7/1956 | Hirst | 33/551 |
| 2,831,286 | 4/1958 | Eisner | 249/112 |
| 3,414,642 | 12/1968 | Baum | 264/126 |
| 3,598,358 | 8/1971 | Clearwaters et al. | 249/117 |
| 3,741,706 | 6/1973 | Conley et al. | 425/DIG. 57 |
| 3,883,456 | 5/1975 | Finck | 524/397 |
| 3,891,179 | 6/1975 | Berman | 425/DIG. 57 |
| 3,892,510 | 7/1975 | Meth et al. | 425/173 |
| 3,921,801 | 11/1975 | Sway | 206/575 |
| 3,966,166 | 6/1976 | Elliott | 425/DIG. 57 |
| 4,015,327 | 4/1977 | McCarthy | 206/575 |
| 4,215,843 | 8/1980 | Gay et al. | 425/DIG. 57 |
| 4,275,028 | 6/1981 | Cohen | 264/126 |
| 4,284,407 | 8/1981 | Hofstetter | 434/82 |
| 4,299,548 | 11/1981 | Saffer et al. | 425/DIG. 57 |
| 4,332,074 | 6/1982 | Auld et al. | 29/527.4 |
| 4,538,787 | 9/1985 | Fox et al. | 249/112 |
| 4,767,009 | 8/1988 | Hornecker et al. | 206/575 |
| 4,828,116 | 5/1989 | Garcia | 206/575 |

FOREIGN PATENT DOCUMENTS

| 1906275 | 9/1970 | Fed. Rep. of Germany ... 425/DIG. 57 |
| 1-155884 | 6/1989 | Japan .......................... 425/DIG. 57 |

Primary Examiner—James C. Housel
Attorney, Agent, or Firm—Sughrue, Mion, Zinn Macpeak & Seas

[57] ABSTRACT

A plastic-model kit having a plurality of components containing at least one die sheet for molding having cavities therein and at least one thermoplastic resin having a low softening temperature, the die sheet and the thermoplastic resin being packed together in a unitary package. The thermoplastic resin can be softened, by dipping in hot water, for example, at about 60° C. to 80° C., and the softened resin can be cast by hand or by a simple tool into the cavities on or through the molding die sheet and then cooled at ordinary temperature (that is, 20° C. to 30° C.) to form various shaped and sized pieces for the plastic-model kit. Ornaments or decorations having a three-dimensional or roughly three-dimensional visuality such as for dolls, human models, animal models, building models, ship models, car models, airplane models, and the like can be assembled from the plastic-model kit. In addition, various accessories, for the hair or clothes and the like can be assembled from the present plastic-model kit. These various products all have an individual and different characteristic of shape, designs, sizes and/or color, and, accordingly, provide a wide scope of creativity to artists or hobbyists when assembling the same.

16 Claims, 1 Drawing Sheet

PLASTIC-MODEL KIT

FIELD OF THE INVENTION

The present invention relates to a plastic-model kit.

BACKGROUND OF THE INVENTION

Hitherto, various types of assembly-kits or ready-made ornaments or decorations, etc., have been widely sold on a commercial basis.

These assembly-kits are composed of ready-made, variously shaped, colored, and/or sized pieces from which an ornament, a decoration or a toy such as a doll, human models, animal models, building models, ship models, car models, airplane models and the like are assembled in the form of ready-made shapes, designs, sizes and/or colors.

In addition, various ready-made accessories such as earrings, bracelets, brooches, and accessories combined with hairpins, are widely sold on a commercial basis and are widely used.

Similarly, a georama-kit from which various panoramic landscape models of, for example, historical battlefields or natural landscapes, exhibited with a three-dimensional visuality, can be assembled, are sold on a commercial basis and are widely used, particularly by hobbyists in these fields.

The georama-kit is composed of a mixture of crushed paper and a binder, silicone compound to be molded, and plastic sheets and color paints and the like, which can be formed or reformed by combining various shapes or colors as desired.

Such ready-made ornaments or decorations, ready-made accessories and/or georama-kits are usually brightly colored, well-shaped, properly designed, moderate in size, and economically priced, and thus have become widely used, due to their mass-production by injection molding, etc., on an industrial basis.

In addition, the various ready-made pieces for the above-described assembly-kits are mass-produced on an industrial basis.

Many consumers, however, generally think and act from individually different points of view and their value judgements, and accordingly, their various needs or desires for a variety of creative activities cannot be easily satisfied by the ready-made products or assembly-kits as described above.

Accordingly, to meet these needs and desires in the case of ready-made products or assembly-kits composed of ready-made pieces, a great many combinations of pieces in different colors, designs, sizes, and shapes must be prepared.

To prepare so many pieces, a great many dies for molding must be prepared, to obtain various kinds of products, in spite of small production volume thereof, and this use of a great many dies for molding, and the production of various kinds of products, inevitably considerably increases production costs and sales costs.

Also, a problem arises in all of these various kinds of goods must be controlled while being transported and stored.

As a result of extensive investigations noting such a background, the inventor of this invention has found that it is possible to solve the problems noted above by a plastic-model kit according to the present invention.

SUMMARY OF THE INVENTION

It is an object of the present invention to provide a plastic-model kit from which ornaments or decorations and/or various accessories having a three-dimensional or roughly three-dimensional visuality can be assembled from nonuniform or nonstandard pieces that are individually different in shape, design, sizes and/or color.

To achieve this object, the present invention is directed to a plastic-model kit comprising a plurality of components which includes at least one die sheet for molding having cavities and at least one thermoplastic resin having a low softening temperature, the die sheet for molding and the thermoplastic resin being packed together in a unitary package.

The thermoplastic resin(s) can be softened even by dipping in warm or hot, for example, approximately 60° to 80° C., water, and the softened resin(s) can be cast by hand, or by using simple tools, into the cavities embossed on or punched through the thickness direction of the die sheet(s) for molding, and then cooled at room temperature (that is, 20° C. to 30° C.) to form differently shaped or designed pieces.

Accordingly, artists and hobbyists are given a wide scope for their creativity when assembling the same.

Ornaments or decorations having a three-dimensional or roughly three-dimensional visuality, such as dolls, human models, animal models, building models, ship models, car models, airplane models and the like, can be assembled from the present plastic-model kit.

In addition, various accessories, for the hair or clothes and the like can be assembled therefrom.

Such assembled products are not uniform or standardized with regard to color, design, size and/or shape, and provide a wide individual scope.

DETAILED DESCRIPTION OF THE INVENTION

Figure 1:
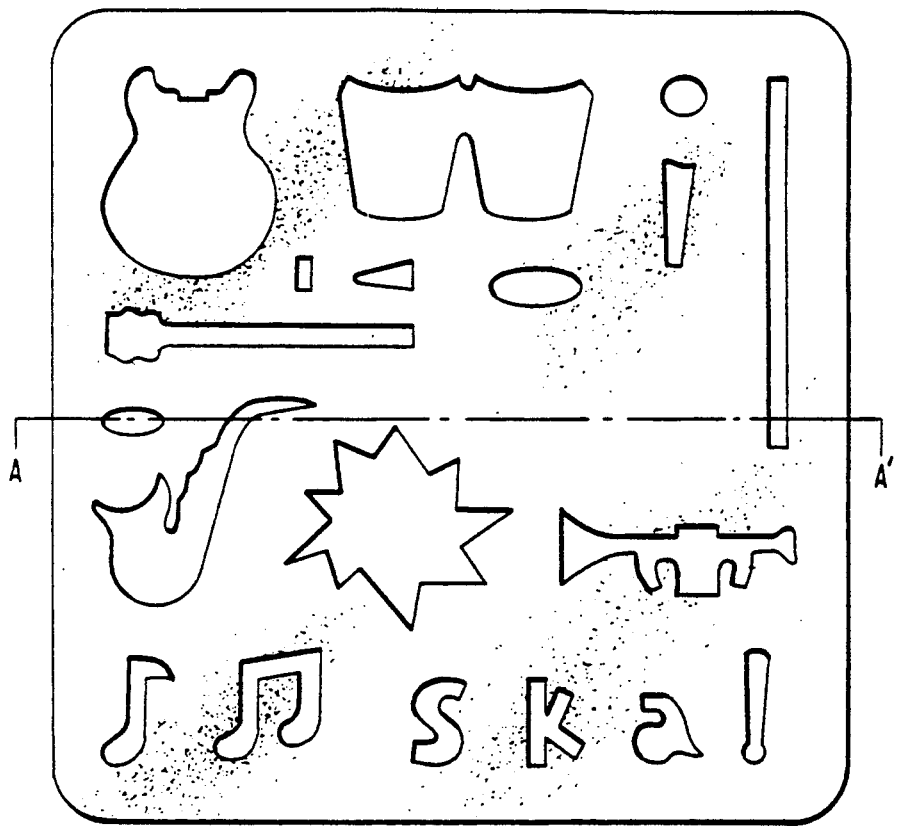
FIG. 1 is a top plan view of a die sheet for molding having a plurality of cavities punched therethrough in accordance with a first embodiment of the present invention.
Figure 2:
FIG. 2 is a cross-sectional view of the die sheet of FIG. 1 along the line A—A'.
Figure 3:
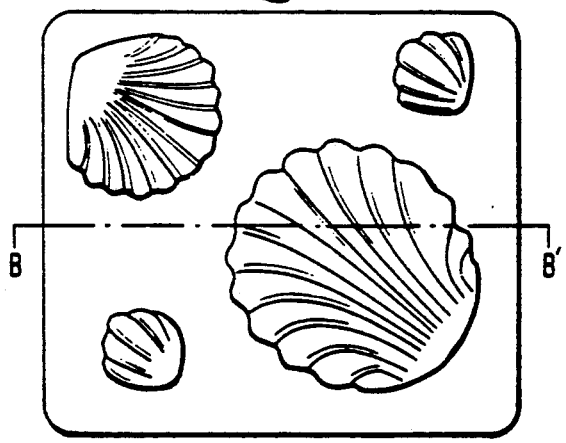
FIG. 3 is a top plan view of a die sheet for molding having a plurality of cavities embossed therein in accordance with a second embodiment of the present invention.
Figure 4:
FIG. 4 is a cross-sectional view of the die sheet of FIG. 3 along the line B—B'.

The present invention is described hereinafter in more detail.

The present plastic-model kit is composed of at least two essential components, that is, a first essential component is a die sheet for molding, from which various shaped and/or sized pieces can be formed.

One or more die sheets for molding can be included in one package.

The die sheet for forming the various shaped or sized pieces may be a simply manufactured die, not a precisely machined metallic die with which plastic resin products are molded in an injection molding on an industrial basis.

Heat resisting materials, even if at a low level, for example, at temperatures of from 60° C. to 100° C., should be used for the die sheet for molding as they are partially or fully heated, by contact with heated and softened resins, described in detail hereinafter to such temperatures in a short period.

Further, the materials for the die sheet for molding must be easily manufactured, and the material price must be economical.

Also, the materials should not have to be adhered to the heated and softened resins.

The die sheet for molding may be either of two preferred types of dies for molding, with regard to outside appearance and function.

The first type has a plurality of cavities punched through the thickness direction of the die sheet for molding, for example, a template type, that is, a trimming die type or a blanking die type, which has a roughly uniform thickness in the depth direction and various complex shapes in a two-dimensional outline.

The second type has a plurality of cavities which are not punched through the thickness direction of the die sheet for molding, but are only concave and/or convex cavities, such as for a woodprint or a lithograph, that is, an embossed type or a transcribed type.

The selection of the above-described two types is preferably made in accordance with the need for a surface concave or convex design of various pieces.

The first type of die sheet is preferably manufactured from soft foamed plastics, for example, urethane foams, polyethylene foams, polypropylene foams and the like having a thickness of about 1 mm to 10 mm, because of their more economical prices.

If the thickness is thinner than about 1 mm, the obtained various shaped pieces do not exhibit a satisfactory three-dimensional outside appearance, but if the thickness is more than 10 mm, the three-dimensional visuality of the molded pieces is excessive and is not preferable.

The foamed materials themselves also can be colored, to ensure a good appearance thereof.

Also, the foamed plastic sheet can be laminated with another finely foamed plastic sheet or non-foamed plastic sheet, to increase the flexural strength of the punched die sheet.

The second type of die sheet should be manufactured from hard or rigid plastics sheets or films, for example, nylon, hard or rigid polypropylene, and hard or rigid polyethylene, generally having a thickness of from about 0.1 mm to 3 mm, and preferably from 0.5 mm to 1 mm.

If the thickness is not more than 0.1 mm, the flexural strength is too low, but if it is more than 3 mm, the materials costs are increased without a corresponding benefit.

The cavities in the first type of die sheet can be easily formed by punching with a press having variously shaped cutters, each cavity preferably being different in shape or size to allow a wide selection of combinations of various shaped or sized pieces.

The specified shapes of the cavities include, for example, a hand shape, a leg shape, a face shape, and the like in the case of a doll-model kit, an animal-model kit, and or a human-model kit, and a wing shape or a wheel shape in the case of plastic airplane-model kit.

The cavities in the second type of die sheet can be easily formed by vacuum forming or a compression molding of the rigid plastic films or sheets.

Although the depth of the each cavity is not limited, preferably it is from 1 to 20 mm, and more preferably from 2 to 10 mm.

If the depth is not more than 1 mm, the molded pieces do not exhibit a good three-dimensional visuality, but if it is more than 20 mm, the three-dimensional visuality of the molded pieces is excessive and is not preferable.

In addition, although the two-dimensional size of the each cavity is not limited, preferably it is from 1 to 100 $cm^2$, and more preferably from 1 to 10 $cm^2$.

The bottom surface of the cavities has a concave and convex shape, for example, a shell-like pattern or flower pattern, and the like.

The design patterns of the bottom surface of the cavities are not limited and can be any preferred design, and are transcribed on the molded pieces.

The design patterns need not be complex or delicate, and may be a reversal type such as a stamp.

When including letters or characters in the patterns, the reversal type is more preferable because the letters or characters are thus easy to read when formed on the surface of the molded pieces.

A second essential component of the present invention is a thermoplastic resin having a low softening temperature.

Namely, a thermoplastic resin which can be easily softened even at the temperature of warm or boiling (that is, 60° C. to 100° C., and preferably from 60° C. to 80° C.) water, and can be easily solidified at room temperature (that is, 2° C. to 30° C.) while maintaining the shaped patterns and sizes in the cavities of the die sheet for molding.

In the case of the cavities in the first die sheet, that is, the template type cavities, relatively flat but somewhat complex two-dimensional pieces can be formed.

In the case of the cavities in the second die, that is, the transcribing type cavities, the shell-like pattern or flower-like pattern can be transcribed thereon and transferred to the surface of the molded pieces.

A typical thermoplastic resin is lactone resin.

Although polyethylene or polypropylene resin have relatively low softening temperatures, they cannot be softened under temperatures less than about 200° C., and accordingly, cannot be softened even in boiling water.

The thermoplastic lactone resin having various number average molecular weights (that is, corresponding to the relative viscosity) are produced and used in many fields because of the property thereof cf a low softening temperature of approximately 60° to 80° C.

A preferable number average molecular weight value of the lactone resin to be used in the present invention is from 10,000 to 200,000 corresponding to a relative viscosity value of from 1.15 to 3.20.

A polycaprolactone resin can be conventionally prepared by subjecting ε-caprolactone monomer to ring-opening polymerization in the presence of an appropriate catalyst and an initiating reagent having at least one active hydrogen atom, but to obtain the polycaprolactone resin to be used in the present invention, which has a relative viscosity value of from 1.15 to 3.20, a very minor amount (e.g., less than 0.1% by weight, more specifically approximately 0.025%) of water present in the monomer is utilized as the initiating agent having at least one active hydrogen atom, without an addition of other initiating agents.

When the amount of water in the caprolactone monomer is minor, the relative viscosity value of the polycaprolactone resin is larger, that is, the molecular weight of the resin is higher.

When preparing the polycaprolactone resin, a catalyst is preferably used, and as the catalyst used for the ring-opening polymerization, including, for example, an organic titanium compound, an organic tin compound, and a stannous halide such as stannous chloride.

The catalyst is preferably used in an amount of from 0.1 to 5,000 ppm by weight, based on $\epsilon$-caprolactone monomer, preferably at inert gas atmosphere.

In the present invention, the relative viscosity value is measured by a capillary viscometer (Ubbelohde viscometer) according to Japanese Industrial Standard K 6726, using toluene solution containing 1% by weight of a polycaprolactone resin.

The measurement of the relative viscosity value is carried out while maintaining a temperature of 25.00° C.±0.05° C.

A lactone resin having a relative viscosity value of from 1.15 to 3.20 is rigid and tough at ordinary temperatures (i.e., 20° C. to 30° C.).

The lactone resin having a relative viscosity value of from 1.15 to 3.20 is used for many purposes on a commercial basis.

For example, this resin is used as a toggle operating body (Japanese Unexamined Patent Publication (Kokai) No. 1985-240492), a composition for a modelling compound (Japanese Unexamined Patent Publication (Kokai) No. 1986-42679), a medical gypsum material (Japanese Unexamined Patent Publication (Kokai) No. 1983-81042), a splint material, a face mask for shielding from radioactive rays, or a modelling material for a periwig (Japanese Unexamined Patent Publication (Kokai) No. 1985-215018).

Specific examples of the used lactone resin having a relative viscosity value of from 1.15 to 3.20 include PCL-H1, PCL-H4, PCL-H5, and PCL-H7, which are manufactured and supplied on a commercial basis by Daicel Chemical Industries Ltd.

Particularly, high molecular weight lactone resins such as PCL-H5 and PCL-H7 are more preferably used.

These lactone resins can be used alone or as a mixture of two or more thereof.

The use of a mixture of two grades of the lactone resins provides an improved flexural strength of the molded pieces, in comparison with the use of a corresponding resin alone, and accordingly, is suitable for a mold having thin thickness pieces in structures which are easily breakable.

In addition, a mixture of the lactone resins with chlorinated paraffin or chlorinated polyethylene is preferably used, as it is capable of extending the retention time of the softened state in comparison with a resin not containing same.

Other specific thermoplastic resins having low softening temperatures are a transpolyisoprene resin and a transpolyoctenylene resin.

The transpolyisoprene resin is supplied on commercial basis by Kurare Isoprene Chemical Ltd., and a typical transpolyisoprene resin is Kurare TP-301.

The transpolyoctenylene resin is supplied on commercial basis by Huels Ltd., in West Germany, and a typical transpolyoctenylene resin is Vestenamer 8012. Vestenamer A9.

As described hereinabove, one or more kinds of resins having relatively low softening temperatures and solidifying properties at room temperatures can be used.

Blended resins are more preferable because the softening temperatures, there can be suitably adjusted and the advantages of each resin are added.

Such thermoplastic resins can be optionally mixed with plasticizers, stabilizers, and or thermal conducting materials such as metallic powder, and coloring agents or inorganic flatting agents such as titanium dioxide powder and calcium carbonate.

In addition, other resins can be mixed to add various other properties.

The thermoplastic resins in the present invention are not limited in shape or in size, that is, a pellet shape, powder, or beads and slender and short rods can be included.

The pellet shape is most preferable from the point of view of price economy.

The thermoplastic resins are preferably differently colored. Coloration is achieved, for example, by blending dye or pigment with the resin in a molten state.

The colors are not limited, and the greater variety of colors, the better from the point of view of providing a wide selection for individual characters of the products.

The resins are preferably packed separately in a plurality of packages, each containing differently colored resin.

The differently colored resins also can be packed in the small package.

A mixture of the differently colored resins can exhibit a marble-like pattern in the molded pieces.

Each colored resin is preferably packed separately in about 5 g to 100 g for each package.

The package can be made from a polyethylene film or a cellophane film and the like.

A base material to be additionally packed is not limited as long as it does not damage the clothes or human body.

The base material includes clips, clasps, or safety pins, etc.

The base material is provided with small supports or props to which several shaped or sized and/or colored pieces are attached by partially resoftening with a hair dryer, for example, and the base material and the pieces can be firmly fixed together by providing uneven surfaces or holes in a part of the base.

A second additional component is a decorative material which includes, for example, artificial pearl-like beads, metal-plated plastic beads, metal beads, and/or colored glass beads.

A third additional component is an adhesive by which the above-described decorative parts not having a self-adhesive ability can be fixed to the base material or molded pieces.

A fourth additional component is a coloring material (e.g., applied by a marker) for coloring by which the above-described molded pieces made from a non-colored thermoplastic resin can be freely colored according to the desire of the user.

This marker can be prepared by mixing organic dyes or inorganic pigments with a binder such as an adhesive material, followed by dispersing in water or an organic solvent.

An oil-soluble type marker dispersed in an organic solvent is most preferable, providing an advantage of an easy coloring of the molded pieces.

One or more than two color markers are packed, preferably at least three, to enable the making colorful design.

An ink type marker having a felt pen shape, a tube and or small bottle type marker, in which a viscous liquid including the coloring dyes or pigments is filled, can be suitably used.

In the case of the tube and or the small bottle type marker, the viscous liquid is painted on the surface of the molded pieces by being extruded from the tube or bottle.

Where at least 5 different colored thermoplastic resins are packed in the package, the markers may not be necessary.

A plurality of the above-described units are packed together in one package or box on which, for example, the company's name and/or trademark, or an explanatory description or colored design, are preferably printed.

The printed matter on the surface of the package or the box is not always necessary as it does not affect the functions of the present plastic-model kit, but may be essential from the viewpoint of the marketing of the products.

The following, is a description of actual use of the present plastic-model kit, in which an ornament or a decoration having a three-dimensional or roughly three-dimensional visuality is assembled.

First, for example, pellet-shaped thermoplastic resins are taken out of the package and dipped into warm or hot water at more than 60° C., preferably 60° C. to 80° C., and then left for few minutes to soften.

After the pellet-shaped resins are softened, they are taken out of the warm or hot water and cast into the cavities of the die sheet for molding, followed by dipping into water at an ordinary temperatures (20°–30° C.) to solidify.

After the solidifying the molded pieces are taken out from the cavities.

These operations are carried out for a plurality of cavities, to prepare several shaped, sized, and or colored pieces, and the solidified molded pieces are assembled by being adhered to each other.

The adhering is carried out by using the above-described adhesives or by a partially softening thereof.

The present invention is now specifically illustrated by examples.

EXAMPLE 1

A first die sheet was prepared for molding, and comprised a green-colored foamed polyethylene sheet having a uniform thickness of about 2.5 mm and a two-dimensional area of 150 mm × 150 mm to which a white-colored unfoamed polyethylene sheet having a uniform thickness of about 1 mm was laminated for an additional flexural strength, for molding by an ultra-sonic sealing method.

The sheet was cut at four corners to form rounded corners, and was punched with a press cutter having 20 various shaped or sized cutting blades, to form various shaped or sized cavities.

The 20 various shaped or sized cutting blades included a trumpet shape, a star-spangle shape, a slender rod shape, an ellipsoid shape, a three-pod shape, and the like, and the punched pieces were fixed by being fitted in the corresponding cavity of the sheet.

A second die sheet for molding was prepared for molding in the same was as the first sheet, except that it was a red-colored foamed polyethylene sheet, and was cut at four corners to form demi-circular shapes.

The second sheet was also punched with a press cutter having 14 various shaped or sized cutting blades, and the punched pieces were fixed by being fitted in each corresponding cavity of the sheet.

The 14 various shaped or sized cutting blades include different sized slender ellipse shapes, semi-circular shapes, triangular shapes, palm of the hand shapes, dumbbells shapes, and the like.

Separately, thermoplastic caprolactone resins called "Jiyu Jushi" and having a relative viscosity valve of 2.80 and of 9 different colors, that is, red, yellow, black, and white, etc., were prepared in the form of pellets.

For reference, "Jiyu Jushi" means "Free Plastic", that is, a freely and easily formable and reformable resin.

The resins were enclosed separately by color by heat sealing in small bags made from heat sealable cellophane film.

Further, the small bags were enclosed in one large size bag made from polyethylene film.

Separately, a colored explanatory paper, a monochromatic explanatory paper, and a relatively rigid polyethylene sheet having a thickness of about 0.5 mm, as a backing plate for the punched die, were prepared.

Thereafter, a plurality of the above-described units were packed collectively in one colorfully printed paper case to form a plastic-model kit named "Light Art Kit".

EXAMPLE 2

A rigid sheet was prepared for the manufacture of a die sheet for molding and comprising a semi-transparent polyethylene having a uniform thickness of about 0.5 mm and a two-dimensional area of 90 mm × 80 mm.

The rigid sheet was cut at four corners to form rounded corners, and was embossed with a heated press having 4 different sized irons in order to provide a shell-like pattern thereon.

The depth of cavities embossed on the sheet was from about 3 mm to 12 mm.

Separately, thermoplastic caprolactone resins having 6 different colors, for example, grey, white and ivory, etc. were prepared in the form of pellets.

These resins were separately enclosed color-by-color in heat-sealed small bags made from am heat-sealable cellophane film.

Further, yellow, black, and blue colored resins were enclosed together in one small bag made from a heat-sealable cellophane film.

Separately, an adhesive was prepared and enclosed in a small bag made from an aluminum laminated heat-sealable film.

Further, pearl-like beads and clasps were separately prepared and packed in a small bag made from cellophane and sealed with staples.

Also, a monochromatic explanatory paper was prepared.

A plurality of the above-described units were packed collectively in one colorfully printed paper bag having a window made from transparent film to form a plastic-model kit, "Marbling Art by Free Plastics" or an "Accessory-Kit" usable to make earrings for women.

While the invention has been described in detail and with reference to specific embodiments thereof, it will be apparent to one skilled in the art that various changes and modifications can be made therein without departing from the spirit and scope thereof.

What is claimed is:

1. A plastic-model kit for assembling an ornament or decoration having a three-dimensional visuality comprising a plurality of components which comprises at least components (a), (b) and (c):

(a) at least one die sheet for molding having a plurality of cavities for molding individually shaped pieces, said die sheet being substantially flat and said cavities in the die sheet are defined by open shaped apertures therein extending the thickness of the die sheet;

(b) at least one thermoplastic resin having a softening temperature of from 60° to 100° C., said thermoplastic resin comprising multiple differently colored resins in the shape selected from the group consisting of a pellet, powder, bead, and rod, which differently colored resins are contained separately in a plurality of packages; and (c) a unitary package for carrying the kit components, said die sheet for molding and said plurality of packages containing the thermoplastic resin being packed together in the unitary package, wherein said individually shaped and solidified molded pieces are assembled to obtain the ornament or decoration.

2. A plastic-model kit as set forth in claim 1, wherein said thermoplastic resin is a lactone resin having a relative viscosity value of from 1.15 to 3.20.

3. A plastic-model kit as set forth in claim 2, wherein said lactone resin is mixed with chlorinated paraffin.

4. A plastic-model kit as set forth in claim 2, wherein said lactone resin is mixed with chlorinated polyethylene.

5. A plastic-model kit as set forth in claim 1, additionally comprising at least one coloring material for coloring.

6. A plastic-model kit as set forth in claim 1, additionally comprising a base material to which shaped pieces formed by said resin are to be attached.

7. A plastic-model kit as set forth in claim 6, additionally comprising an adhesive for adhering solidified molded pieces to the base material.

8. A plastic-model kit as set forth in claim 1, wherein said die sheet for molding has a plurality of cavities punched therethrough.

9. A plastic model kit as set forth in claim 1, wherein decorative parts are included.

10. A plastic-model kit as set forth in claim 1, wherein said thermoplastic resin is transpolyisoprene.

11. A plastic-model kit as set forth in claim 1, wherein said thermoplastic resin is transpolyoctenylene.

12. A plastic-model kit as set forth in claim 1, wherein said die sheet for molding is formed by a rigid film.

13. A plastic-model kit as set forth in claim 1, wherein said die sheet for molding is formed by a foamed plastic.

14. A plastic model kit as set forth in claim 1, wherein said die sheet for molding is a rigid polypropylene sheet having a thickness of from 0.5 mm to 1 m.

15. A plastic-model kit as set forth in claim 1, wherein said die sheet for molding is manufactured from a laminated sheet of a foamed polyethylene sheet with an unfoamed polyethylene sheet.

16. A plastic-model kit for assembling an ornament or decoration having a three-dimensional visuality comprising a plurality of components which comprises at least components (a), (b) and (c);

(a) at least one die sheet for molding having a plurality of cavities punched therethrough for molding individually shaped pieces, said die sheet having a thickness of from 1 to 10 mm said die sheet being substantially flat and said cavities in the die sheet are defined by open shaped apertures therein extending the thickness of the die sheet;

(b) at least one thermoplastic resin having a softening temperature of from 60° to 100° C., said thermoplastic resin comprising multiple differently colored resins in the shape of a pellet, powder, bead or rod, which differently colored resins are contained separately in a plurality of packages; and (c) a unitary package for carrying the kit components, said die sheet for molding and said plurality of packages containing the thermoplastic resin being packed together in the unitary package, wherein said individually shaped and solidified molded pieces are assembled using an adhesive or by partially softening the molded pieces to obtain the oranment or decoration.

* * * * *